(12) United States Patent
Tanaka et al.

(10) Patent No.: US 12,744,238 B2
(45) Date of Patent: Sep. 22, 2026

(54) SOLID ELECTROLYTE MATERIAL, AND BATTERY USING SAME

(71) Applicant: Panasonic Intellectual Property Management Co., Ltd., Osaka (JP)

(72) Inventors: Yoshiaki Tanaka, Kyoto (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 656 days.

(21) Appl. No.: 18/308,320

(22) Filed: Apr. 27, 2023

(65) Prior Publication Data

US 2023/0307703 A1 Sep. 28, 2023

Related U.S. Application Data

(63) Continuation of application No. PCT/JP2021/031797, filed on Aug. 30, 2021.

(30) Foreign Application Priority Data

Oct. 28, 2020 (JP) ................................ 2020-180937

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
CPC ................................................ H01M 10/0562
See application file for complete search history.

(56) References Cited

U.S. PATENT DOCUMENTS

| | | | |
|---|---|---|---|
| 10,892,480 | B2 | 1/2021 | Goto |
| 12,113,166 | B2 | 10/2024 | Tanaka et al. |
| 12,237,466 | B2 | 2/2025 | Tanaka et al. |
| 2012/0301796 | A1 | 11/2012 | Ohtomo et al. |
| 2016/0268628 | A1 | 9/2016 | Masuko et al. |
| 2018/0309167 | A1 | 10/2018 | Kaga et al. |

(Continued)

FOREIGN PATENT DOCUMENTS

| | | | |
|---|---|---|---|
| CN | 102332580 | A | 1/2012 |
| CN | 102456918 | A | 5/2012 |

(Continued)

OTHER PUBLICATIONS

International Search Report issued on Sep. 28, 2021 in International Patent Application No. PCT/JP2021/031797, with English translation.

(Continued)

*Primary Examiner* — Karie O'Neill Apicella
(74) *Attorney, Agent, or Firm* — WHDA, LLP

(57) ABSTRACT

A solid electrolyte material of the present disclosure includes: Li; M; O; X; and A. The M is at least one selected from the group consisting of Ti, Zr, and Hf. The X is at least one selected from the group consisting of F, Cl, Br, and I. The A is at least one selected from the group consisting of P and B. A molar ratio of the Li to the M is 1.0 or more and 3.0 or less. A molar ratio of the O to the X is 0.2 or more and 0.7 or less. A molar ratio of the A to the M is 0.02 or more and 0.80 or less.

8 Claims, 3 Drawing Sheets

(56) References Cited

U.S. PATENT DOCUMENTS

| | | | |
|---|---|---|---|
| 2020/0083529 | A1 | 3/2020 | Natsui et al. |
| 2020/0144575 | A1 | 5/2020 | Ku et al. |
| 2020/0328455 | A1 | 10/2020 | Sakai et al. |
| 2020/0328465 | A1 | 10/2020 | Sakaida et al. |
| 2020/0350562 | A1 | 11/2020 | Sugimoto et al. |
| 2020/0350621 | A1 | 11/2020 | Sugimoto et al. |
| 2020/0350627 | A1 | 11/2020 | Sugimoto et al. |
| 2021/0098823 | A1 | 4/2021 | Sakai et al. |
| 2021/0184201 | A1 | 6/2021 | Choi et al. |
| 2021/0242494 | A1 | 8/2021 | Tanaka et al. |
| 2021/0249683 | A1 | 8/2021 | Tanaka et al. |
| 2021/0296693 | A1 | 9/2021 | Nishio et al. |
| 2021/0391593 | A1 | 12/2021 | Kubo et al. |
| 2021/0391594 | A1 | 12/2021 | Kubo et al. |
| 2022/0102753 | A1 | 3/2022 | Tanaka et al. |
| 2022/0102755 | A1 | 3/2022 | Miyatake et al. |
| 2022/0109182 | A1 | 4/2022 | Takahashi et al. |
| 2022/0209287 | A1 | 6/2022 | Tanaka et al. |
| 2022/0246983 | A1 | 8/2022 | Suzuki et al. |
| 2022/0393242 | A1 | 12/2022 | Han et al. |
| 2023/0042911 | A1 | 2/2023 | Sasaki et al. |
| 2023/0106765 | A1 | 4/2023 | Takeuchi et al. |
| 2023/0268550 | A1 | 8/2023 | Tanaka et al. |
| 2023/0307703 | A1 | 9/2023 | Tanaka et al. |
| 2023/0307704 | A1 | 9/2023 | Tanaka et al. |
| 2024/0039044 | A1 | 2/2024 | Tanaka et al. |
| 2024/0047680 | A1 | 2/2024 | Miyamoto et al. |
| 2024/0145704 | A1 | 5/2024 | Miyamoto et al. |
| 2024/0178383 | A1 | 5/2024 | Sagara et al. |
| 2024/0413394 | A1 | 12/2024 | Tanaka et al. |

FOREIGN PATENT DOCUMENTS

| | | | | | |
|---|---|---|---|---|---|
| CN | 109626996 | A | | 4/2019 | |
| CN | 116845344 | A | | 10/2023 | |
| JP | 2006156284 | A | * | 6/2006 | ............ C01B 25/45 |
| JP | 2006-244734 | A | | 9/2006 | |
| JP | 2009-277383 | A | | 11/2009 | |
| JP | 2011-129312 | A | | 6/2011 | |
| JP | 2016-169142 | A | | 9/2016 | |
| JP | 2020-172410 | A | | 10/2020 | |
| WO | 2011/073798 | A2 | | 6/2011 | |
| WO | 2012/112229 | A2 | | 8/2012 | |
| WO | 2015/079509 | A1 | | 6/2015 | |
| WO | 2017/141735 | A1 | | 8/2017 | |
| WO | 2019/135323 | A1 | | 7/2019 | |
| WO | 2019/146294 | A1 | | 8/2019 | |
| WO | 2019/146295 | A1 | | 8/2019 | |
| WO | 2019/146296 | A1 | | 8/2019 | |
| WO | 2020/070955 | A1 | | 4/2020 | |
| WO | 2020/137026 | A1 | | 7/2020 | |
| WO | 2020/137153 | A1 | | 7/2020 | |
| WO | 2020/137155 | A1 | | 7/2020 | |
| WO | 2020/188914 | A1 | | 9/2020 | |
| WO | 2020/188915 | A1 | | 9/2020 | |
| WO | 2021/024785 | A1 | | 2/2021 | |
| WO | 2021/049416 | A1 | | 3/2021 | |
| WO | 2021/220924 | A1 | | 11/2021 | |

OTHER PUBLICATIONS

International Search Report issued on Jun. 15, 2021 in International Patent Application No. PCT/JP2021/014089, with English translation.

International Search Report issued on Oct. 12, 2021 in International Patent Application No. PCT/JP2021/031798, with English translation.

International Search Report issued on Apr. 19, 2022 in International Patent Application No. PCT/JP2022/004137, with English translation.

International Search Report of PCT application No. PCT/JP2020/011720 dated Jun. 23, 2020.

International Search Report of PCT application No. PCT/JP2020/034799 dated Dec. 1, 2020.

International Search Report of PCT application No. PCT/JP2022/044223 dated Feb. 7, 2023.

Extended European Search Report dated Jun. 7, 2024 issued in the corresponding European Patent Application No. 21822973.0.

Extended European Search Report dated Nov. 12, 2024 issued in the corresponding European Patent Application No. 22784322.4.

English Translation of Chinese Search Report dated Oct. 28, 2024 for the related Chinese Patent Application No. 202080071776.6.

The Indian OA dated Jul. 26, 2023 for the related Indian Patent Application No. 202147058875.

Fudong Han et al., "Electrochemical Stability of Li10GeP2S12 and Li7La3Zr2012 Solid Electrolytes", Advanced Energy Materials, Jan. 21, 2016, 1501590.

Tetsuya Asano; Akihiro Sakai; Satoru Ouchi; Masashi Sakaida; Akinobu Miyazaki; Shinya Hasegawa: "Solid Halide Electmlytes witll High Lithium-ion Conductivity for Application in 4 V Class Bulk-Type Ali-Solid-State Batteries", Advanced Materials, vol. 30, No. 44, Sep. 14, 2018, pp. 1-7, XP05572199.1, DE, ISSN: 0935-9648, DOi https://doLorg/10.1002/adma.201803075.

Non-Final Office Action dated Jun. 11, 2025 issued in U.S. Appl. No. 18/062,884.

Final Office Action dated Dec. 22, 2025 issued in U.S. Appl. No. 18/062,884.

Notice of Allowance dated Dec. 12, 2025 issued in U.S. Appl. No. 18/308,329.

Notice of Allowance dated Jul. 29, 2024 issued in U.S. Appl. No. 17/546,134.

Non-Final Office Action dated Aug. 8, 2024 issued in U.S. Appl. No. 17/696,964.

Notice of Allowance dated Nov. 6, 2024 issued in U.S. Appl. No. 17/696,964.

* cited by examiner

SOLID ELECTROLYTE MATERIAL, AND BATTERY USING SAME

This application is a continuation of PCT/JP2021/031797 filed on Aug. 30, 2021, which claims foreign priority of Japanese Patent Application No. 2020-180937 filed on Oct. 28, 2020, the entire contents of both of which are incorporated herein by reference.

BACKGROUND OF THE INVENTION

1. Field of the Invention

The present disclosure relates to a solid electrolyte material and a battery using the same.

2. Description of Related Art

JP 2011-129312 A discloses an all-solid-state battery using a sulfide solid electrolyte material.

WO 2020/070955 A1 discloses a solid electrolyte material represented by $Li_{6-4a}M_aX_6$, where M is at least one selected from the group consisting of Zr, Hf, and Ti, X is a halogen element, and a mathematical relation $0<a<1.5$ is satisfied.

SUMMARY OF THE INVENTION

The present disclosure aims to provide a novel and highly useful solid electrolyte.

A solid electrolyte material of the present disclosure includes:

Li;

M;

O;

X; and

A, wherein the M is at least one selected from the group consisting of Ti, Zr, and Hf, the X is at least one selected from the group consisting of F, Cl, Br, and I, the A is at least one selected from the group consisting of P and B, a molar ratio of the Li to the M is 1.0 or more and 3.0 or less, a molar ratio of the O to the X is 0.2 or more and 0.7 or less, and a molar ratio of the A to the M is 0.02 or more and 0.80 or less.

The present disclosure provides a novel and highly useful solid electrolyte.

DETAILED DESCRIPTION

Figure 1:
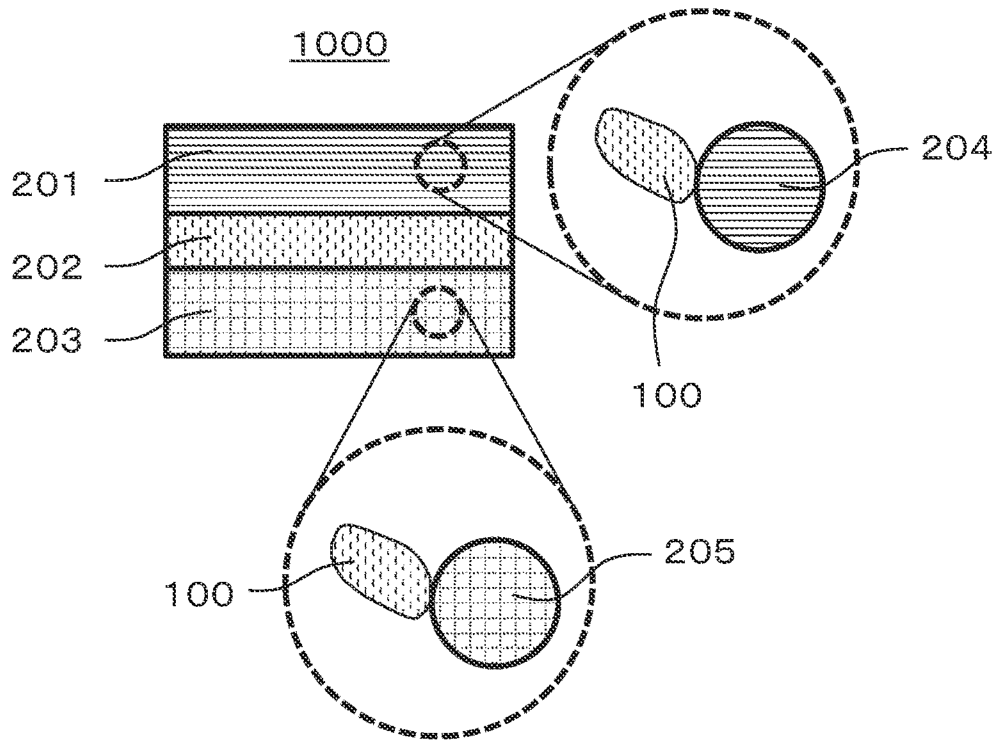
FIG. 1 shows a cross-sectional view of a battery 1000 according to a second embodiment.

Embodiments of the present disclosure will be described below with reference to the drawings. The present disclosure is not limited to the following embodiments.

First Embodiment

A solid electrolyte material according to a first embodiment includes Li, M, O, X, and A. M is at least one selected from the group consisting of Ti, Zr, and Hf. X is at least one selected from the group consisting of F, Cl, Br, and I. A is at least one selected from the group consisting of P and B. The molar ratio of Li to M is 1.0 or more and 3.0 or less. The molar ratio of O to X is 0.2 or more and 0.7 or less. The molar ratio of A to M is 0.02 or more and 0.80 or less.

The solid electrolyte material according to the first embodiment is a novel and highly useful solid electrolyte material that is, for example, suitable for conduction of lithium ions. The solid electrolyte material according to the first embodiment can have, for example, a practical lithium-ion conductivity, and has, for example, a high lithium-ion conductivity. Here, a high lithium-ion conductivity is, for example, 0.42 mS/cm or more near room temperature. That is, the solid electrolyte material according to the first embodiment can have an ionic conductivity of, for example, 0.42 mS/cm or more.

In the case where the molar ratio of Li to M is 1.0 or more and 3.0 or less, the concentration of Li serving as the conduction carrier is optimized. In the case where the molar ratio of O to X is 0.2 or more and 0.7 or less, paths for diffusion of lithium ions are easily formed. As a result, the solid electrolyte material according to the first embodiment has a high lithium-ion conductivity.

In the case where the molar ratio of A to M is 0.02 or more and 0.80 or less, the solid electrolyte material has a high stability to heat. For example, even when heated to 150° C., the solid electrolyte material according to the first embodiment hardly decreases in lithium-ion conductivity.

The molar ratio of Li to M is calculated from a mathematical expression (the amount of substance of Li)/(the total of the amounts of substance of Ti, Zr, and Hf). The molar ratio of O to X is calculated from a mathematical expression (the amount of substance of O)/(the total of the amounts of substance of F, Cl, Br, and I). The molar ratio of A to M is calculated from a mathematical expression (the total of the amounts of substance of P and B)/(the total of the amounts of substance of Ti, Zr, and Hf). Hereinafter, the molar ratio of Li to M is also denoted as "Li/M", the molar ratio of O to X is also denoted as "O/X", and the molar ratio of A to M is also denoted as "A/M".

The solid electrolyte material according to the first embodiment can be used to achieve a battery having excellent charge and discharge characteristics. An example of the battery is an all-solid-state battery. The all-solid-state battery may be a primary battery or a secondary battery.

The solid electrolyte material according to the first embodiment can maintain a high lithium-ion conductivity within an expected battery operating temperature range. Therefore, a battery using the solid electrolyte material according to the first embodiment can stably operate even in an environment where the temperature varies. The battery operating temperature range is, for example, from −30° C. to 80° C.

It is desirable that the solid electrolyte material according to the first embodiment should be substantially free of sulfur. The phrase "the solid electrolyte material according to the first embodiment is substantially free of sulfur" means that the solid electrolyte material does not contain sulfur as a constituent element except for sulfur inevitably introduced as impurities. In this case, sulfur introduced as impurities into the solid electrolyte material has an amount of, for example, 1 mol % or less. From the viewpoint of safety, it is preferable that the solid electrolyte material according to the first embodiment should be free of sulfur. A solid electrolyte material that is free of sulfur generates no hydrogen sulfide when exposed to the atmosphere, and is accordingly excellent in safety. Note that the sulfide solid electrolyte material disclosed in JP 2011-129312 A can generate hydrogen sulfide when exposed to the atmosphere.

To increase the ionic conductivity of the solid electrolyte material, the solid electrolyte material according to the first embodiment may consist substantially of Li, M, O, X, and A. Here, the phrase "the solid electrolyte material according to the first embodiment consists substantially of Li, M, O, X, and A" means that the ratio of the sum of the amounts of substance of Li, M, O, X, and A to the total of the amounts of substance of all the elements constituting the solid electrolyte material according to the first embodiment (i.e., the mole fraction) is 90% or more. In an example, the ratio may be 95% or more.

To increase the ionic conductivity of the solid electrolyte material, the solid electrolyte material according to the first embodiment may consist of Li, M, O, X, and A.

To increase the ionic conductivity of the solid electrolyte material, M may include Zr. M may be Zr.

To increase the ionic conductivity of the solid electrolyte material, X may include Cl. X may be Cl.

To increase the ionic conductivity of the solid electrolyte material, A may include P. A may be P.

The upper and lower limits for the molar ratio of Li to M can be defined by any combination of numerical values selected from 1.0, 1.3, 1.4, 1.5, and 3.0.

To increase the ionic conductivity of the solid electrolyte material, the molar ratio of Li to M may be 1.3 or more and less than 2.0, or 1.3 or more and 1.5 or less.

The upper and lower limits for the molar ratio of O to X can be defined by any combination of numerical values selected from 0.2, 0.30, 0.31, 0.32, 0.35, 0.37, 0.39, 0.41, 0.52, 0.63, and 0.7.

To increase the ionic conductivity of the solid electrolyte material, the molar ratio of O to X may be 0.3 or more and 0.63 or less, 0.3 or more and 0.52 or less, or 0.3 or more and 0.41 or less.

The upper and lower limits for the molar ratio of A to M can be defined by any combination of numerical values selected from 0.02, 0.04, 0.08, 0.12, 0.13, 0.16, 0.20, 0.40, 0.60, and 0.80.

To increase the ionic conductivity of the solid electrolyte material, the molar ratio of A to M may be 0.04 or more and 0.60 or less.

To increase the ionic conductivity of the solid electrolyte material, the molar ratio of A to M may be 0.04 or more and 0.20 or less.

The solid electrolyte material according to the first embodiment may be crystalline or amorphous.

The solid electrolyte material according to the first embodiment may be amorphous. An amorphous solid electrolyte has advantages such as no crystalline orientation anisotropy and less influence of the grain boundary as well as less deterioration in ionic conductivity after processing such as pulverization.

The solid electrolyte material according to the first embodiment may include a crystalline phase. The crystalline phase is attributed to, for example, LiX or $Li_{6-4a}M_aX_6$ (a mathematical relation $0<a<1.5$ is satisfied).

The solid electrolyte material according to the first embodiment may include both or only one of an amorphous phase and a crystalline phase. The microstructure of the solid electrolyte material can be examined by X-ray diffraction measurement.

The shape of the solid electrolyte material according to the first embodiment is not limited. The shape is, for example, acicular, spherical, or ellipsoidal. The solid electrolyte material according to the first embodiment may be particulate. The solid electrolyte material according to the first embodiment may be formed in the shape of a pellet or a plate.

In the case where the shape of the solid electrolyte material according to the first embodiment is particulate (e.g., spherical), the solid electrolyte material may have a median diameter of 0.1 μm or more and 100 μm or less, or may have a median diameter of 0.5 μm or more and 10 μm or less. In this case, the solid electrolyte material according to the first embodiment and other materials can be favorably dispersed. The median diameter of particles means the particle diameter (d50) at a cumulative volume equal to 50% in the volumetric particle size distribution. The volumetric particle size distribution can be measured with a laser diffraction measurement device or an image analysis device.

In the case where the shape of the solid electrolyte material according to the first embodiment is particulate (e.g., spherical), the solid electrolyte material may have a smaller median diameter than the active material. In this case, the solid electrolyte material according to the first embodiment and the active material can form a favorable dispersion state.

<Method of Manufacturing Solid Electrolyte Material>

The solid electrolyte material according to the first embodiment can be manufactured by the following method.

Raw material powders are prepared so as to obtain a target composition. Examples of the raw material powders include an oxide, a hydroxide, a halide, and an acid halide.

In an example, assume a case where a solid electrolyte material consists of Li, Zr, O, Cl, and P (i.e., a solid electrolyte material includes M that is Zr, X that is Cl, and A that is P) and has a molar ratio Li/M of 1.4, a molar ratio O/X of 0.375, and a molar ratio A/M of 0.04 in the raw material mixing. In this case, $Li_2O_2$, $ZrCl_4$, and $P_2O_5$ are mixed together at a molar ratio of $Li_2O_2$:$ZrCl_4$:$P_2O_5$=0.7:1:0.02. M, X, and A are determined by selecting the raw material powders. The molar ratios Li/M, O/X, and A/M are determined by selecting the mixing ratio between the raw material powders. The raw material powders may be mixed together at a molar ratio adjusted in advance so as to cancel out a composition change which can occur in the synthesis process.

The mixture of the raw material powders is fired to obtain a reaction product. To suppress evaporation of the raw materials due to firing, the mixture of the raw material powders may be sealed in an airtight container formed of quartz glass or borosilicate glass and fired in a vacuum or an inert gas atmosphere. The inert gas atmosphere is, for example, an argon atmosphere or a nitrogen atmosphere.

Alternatively, the mixture of the raw material powders may be reacted with each other mechanochemically in a mixer such as a planetary ball mill to obtain a reaction product. That is, mixing and reaction of the raw material powders may be performed by a mechanochemical milling method. By these methods, the solid electrolyte material according to the first embodiment is obtained.

Firing or mechanochemical reaction of the mixture of the raw material powders sometimes causes a portion of O to evaporate from the raw material powders. This can result in a smaller value of the molar ratio O/X in the solid electrolyte material than the value of the molar ratio O/X calculated from the molar ratio between the raw material powders.

The composition of the solid electrolyte material can be determined, for example, by an inductively coupled plasma (ICP) emission spectrometry, an ion chromatography, an inert gas fusion-infrared absorption method, or an electron probe micro-analyzer (EPMA) method. For example, the compositions of Li and M can be determined by the ICP emission spectrometry, the composition of X can be determined by the ion chromatography, the composition of O can be determined by the inert gas fusion-infrared absorption method, and the composition of A can be determined by the EPMA method.

Second Embodiment

A second embodiment will be described below. The matters described in the first embodiment may be omitted as appropriate.

A battery according to the second embodiment includes a positive electrode, an electrolyte layer, and a negative electrode. The electrolyte layer is disposed between the positive electrode and the negative electrode. At least one selected from the group consisting of the positive electrode, the electrolyte layer, and the negative electrode includes the solid electrolyte material according to the first embodiment.

Owing to including the solid electrolyte material according to the first embodiment, the battery according to the second embodiment has excellent charge and discharge characteristics.

FIG. 1 shows a cross-sectional view of a battery 1000 according to the second embodiment.

The battery 1000 includes a positive electrode 201, an electrolyte layer 202, and a negative electrode 203. The electrolyte layer 202 is disposed between the positive electrode 201 and the negative electrode 203.

The positive electrode 201 includes positive electrode active material particles 204 and solid electrolyte particles 100.

The electrolyte layer 202 includes an electrolyte material. The electrolyte material is, for example, a solid electrolyte material.

The negative electrode 203 includes negative electrode active material particles 205 and the solid electrolyte particles 100.

The solid electrolyte particles 100 are particles including the solid electrolyte material according to the first embodiment. The solid electrolyte particles 100 may be particles including the solid electrolyte material according to the first embodiment as the main component. The particles including the solid electrolyte material according to the first embodiment as the main component refer to particles in which the component contained in the largest amount in molar ratio is the solid electrolyte material according to the first embodiment. The solid electrolyte particles 100 may be particles consisting of the solid electrolyte material according to the first embodiment.

The positive electrode 201 includes a material capable of occluding and releasing metal ions such as lithium ions. The positive electrode 201 includes, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include $Li(Ni, Co, Al)O_2$, $Li(Ni, Co, Mn)O_2$, and $LiCoO_2$.

In the present disclosure, an expression "(A, B, C)" refers to "at least one selected from the group consisting of A, B, and C".

From the viewpoint of cost and safety of the battery, lithium phosphate may be used as the positive electrode active material.

In the case where the positive electrode 201 includes a solid electrolyte material according to the first embodiment in which X includes I (i.e., iodine), lithium iron phosphate may be used as the positive electrode active material. The solid electrolyte material according to the first embodiment that includes I is susceptible to oxidation. Using lithium iron phosphate as the positive electrode active material suppresses an oxidation reaction of the solid electrolyte material. That is, formation of an oxide layer having a low lithium-ion conductivity is suppressed. As a result, the battery has a high charge and discharge efficiency.

The positive electrode 201 may include, in addition to the solid electrolyte material according to the first embodiment, a transition metal oxyfluoride as the positive electrode active material. The solid electrolyte material according to the first embodiment is not susceptible to formation of a resistance layer even when the solid electrolyte material is fluorinated by the transition metal fluoride. As a result, the battery has a high charge and discharge efficiency.

The transition metal oxyfluoride contains oxygen and fluorine. In an example, the transition metal oxyfluoride may be a compound represented by a composition formula $Li_pMe_qO_mF_n$. Here, Me is at least one selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, and the following mathematical relations are satisfied: $0.5 \leq p \leq 1.5$; $0.5 \leq q \leq 1.0$; $1 \leq m < 2$; and $0 < n \leq 1$. An example of such a transition metal oxyfluoride is $Li_{1.05}(Ni_{0.35}Co_{0.35}Mn_{0.3})_{0.95}O_{1.9}F_{0.1}$.

The positive electrode active material particles 204 may have a median diameter of 0.1 μm or more and 100 μm or less. In the case where the positive electrode active material particles 204 have a median diameter of 0.1 μm or more, the positive electrode active material particles 204 and the solid electrolyte particles 100 can form a favorable dispersion state in the positive electrode 201. This improves the charge and discharge characteristics of the battery. In the case where the positive electrode active material particles 204 have a median diameter of 100 μm or less, the diffusion rate of lithium in the positive electrode active material particles 204 is improved. This enables the battery to operate at a high power.

The positive electrode active material particles 204 may have a larger median diameter than the solid electrolyte particles 100. In this case, the positive electrode active material particles 204 and the solid electrolyte particles 100 can form a favorable dispersion state.

From the viewpoint of energy density and power output of the battery, the ratio of the volume of the positive electrode active material particles 204 to the sum of the volume of the positive electrode active material particles 204 and the volume of the solid electrolyte particles 100 in the positive electrode 201 may be 0.30 or more and 0.95 or less.

Figure 2:
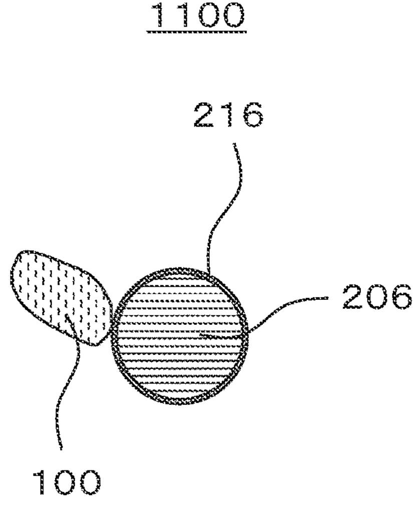
FIG. 2 shows a cross-sectional view of an electrode material 1100 according to the second embodiment.

FIG. 2 shows a cross-sectional view of an electrode material 1100 according to the second embodiment. The electrode material 1100 is, for example, included in the positive electrode 201. To prevent the solid electrolyte particles 100 from reacting with the positive electrode active material (i.e., electrode active material particles 206), a coating layer 216 may be formed on the surface of each of the electrode active material particles 206. In this case, an increase in reaction overvoltage of the battery can be suppressed. Examples of the coating material included in the coating layer 216 include a sulfide solid electrolyte, an oxide solid electrolyte, and a halide solid electrolyte.

In the case where the solid electrolyte particles 100 are those of a sulfide solid electrolyte, the coating material may be the solid electrolyte material according to the first embodiment. The solid electrolyte material according to the first embodiment is less susceptible to oxidation than the sulfide solid electrolyte. Accordingly, an increase in reaction overvoltage of the battery can be suppressed.

In the case where the solid electrolyte particles 100 are those of a solid electrolyte material according to the first embodiment in which X includes I, the coating material may be a solid electrolyte material according to the first embodiment in which X is at least one selected from the group consisting of Cl and Br. A solid electrolyte material according to the first embodiment that does not include I is less susceptible to oxidation than a solid electrolyte material according to the first embodiment that includes I. As a result, the battery has a high charge and discharge efficiency.

In the case where the solid electrolyte particles 100 are those of the solid electrolyte material according to the first embodiment in which X includes I, the coating material may include an oxide solid electrolyte. The oxide solid electrolyte may be lithium niobate, which exhibits an excellent stability even at a high potential. In this case, the battery has a high charge and discharge efficiency.

The positive electrode 201 may consist of a first positive electrode layer including a first positive electrode active material and a second positive electrode layer including a second positive electrode active material. Here, the second positive electrode layer is disposed between the first positive electrode layer and the electrolyte layer 202, the first positive electrode layer and the second positive electrode layer include the solid electrolyte material according to the first embodiment that includes I, and the coating layer 216 is formed on the surface of the second positive electrode active material. According to the above configuration, it is possible to suppress oxidation of the solid electrolyte material according to the first embodiment included in the electrolyte layer 202 caused by the second positive electrode active material. As a result, the battery has a high charge capacity. Examples of the coating material included in the coating layer 216 include a sulfide solid electrolyte, an oxide solid electrolyte, a solid polymer electrolyte, and a halide solid electrolyte. Note that in the case where the coating material is a halide solid electrolyte, the coating material does not include I as a halogen element. The first positive electrode active material may be the same material as the second positive electrode active material, or may be a different material from the second positive electrode active material.

From the viewpoint of energy density and power output of the battery, the positive electrode 201 may have a thickness of 10 μm or more and 500 μm or less.

The electrolyte layer 202 includes an electrolyte material. The electrolyte material is, for example, a solid electrolyte material. The electrolyte layer 202 may be a solid electrolyte layer. The electrolyte layer 202 may include the solid electrolyte material according to the first embodiment. The electrolyte layer 202 may consist of the solid electrolyte material according to the first embodiment.

The electrolyte layer 202 may consist of a solid electrolyte material different from the solid electrolyte material according to the first embodiment. Examples of the solid electrolyte material different from the solid electrolyte material according to the first embodiment include $Li_2MgX'_4$, $Li_2FeX'_4$, $Li(Al, Ga, In)X'_4$, $Li_3(Al, Ga, In)X'_6$, and LiI. Here, X' is at least one selected from the group consisting of F, Cl, Br, and I.

Hereinafter, the solid electrolyte material according to the first embodiment is referred to as a first solid electrolyte material. The solid electrolyte material different from the solid electrolyte material according to the first embodiment is referred to as a second solid electrolyte material.

The electrolyte layer 202 may include the first solid electrolyte material, and in addition, include the second solid electrolyte material. In the electrolyte layer 202, the first solid electrolyte material and the second solid electrolyte material may be homogenously dispersed. A layer consisting of the first solid electrolyte material and a layer consisting of the second solid electrolyte material may be stacked along the stacking direction of the battery 1000.

The electrolyte layer 202 may have a thickness of 1 μm or more and 100 μm or less. In the case where the electrolyte layer 202 has a thickness of 1 μm or more, a short-circuit between the positive electrode 201 and the negative electrode 203 tends not to occur. In the case where the electrolyte layer 202 has a thickness of 100 μm or less, the battery can operate at a high power.

Another electrolyte layer may be further provided between the electrolyte layer 202 and the negative electrode 203. That is, a second electrolyte layer may be further provided between the electrolyte layer 202 and the negative electrode 203. For example, in the case where the electrolyte layer 202 includes the first solid electrolyte material, the second electrolyte layer may consist of another solid electrolyte material that is electrochemically more stable than the first solid electrolyte material. Specifically, the solid electrolyte material constituting the second electrolyte layer may have a lower reduction potential than the first solid electrolyte material. In this case, the first solid electrolyte material can be used without being reduced. As a result, the charge and discharge efficiency of the battery can be improved.

The negative electrode 203 includes a material capable of occluding and releasing metal ions (e.g., lithium ions). The negative electrode 203 includes, for example, a negative electrode active material (e.g., the negative electrode active material particles 205).

Examples of the negative electrode active material include a metal material, a carbon material, an oxide, a nitride, a tin compound, and a silicon compound. The metal material may be a metal simple substance or an alloy. Examples of the metal material include a lithium metal and a lithium alloy. Examples of the carbon material include natural graphite, coke, semi-graphitized carbon, a carbon fiber, spherical carbon, artificial graphite, and amorphous carbon. From the viewpoint of capacity density, preferred examples of the negative electrode active material include silicon (Si), tin (Sn), a silicon compound, and a tin compound.

The negative electrode active material may be selected on the basis of the reduction resistance of the solid electrolyte material included in the negative electrode 203. In the case where the negative electrode 203 includes the first solid electrolyte material, the negative electrode active material to be used may be a material capable of occluding and releasing lithium ions at 1.6 V or more versus lithium. Using such a material as the negative electrode active material can suppress reduction of the first solid electrolyte material included in the negative electrode 203. As a result, the battery has a high charge and discharge efficiency. Examples of the material include a titanium oxide, an indium metal, and a lithium alloy. Examples of the titanium oxide include $LiTi_5O_{12}$, $LiTi_2O_4$, and $TiO_2$.

The negative electrode active material particles 205 may have a median diameter of 0.1 μm or more and 100 μm or less. In the case where the negative electrode active material particles 205 have a median diameter of 0.1 μm or more, the negative electrode active material particles 205 and the solid electrolyte particles 100 can form a favorable dispersion state in the negative electrode 203. This improves the charge and discharge characteristics of the battery. In the case where the negative electrode active material particles 205 have a median diameter of 100 μm or less, the diffusion rate of lithium in the negative electrode active material particles 205 is improved. This enables the battery to operate at a high power.

The negative electrode active material particles 205 may have a larger median diameter than the solid electrolyte particles 100. In this case, the negative electrode active material particles 205 and the solid electrolyte particles 100 can form a favorable dispersion state.

From the viewpoint of energy density and power output of the battery, the ratio of the volume of the negative electrode active material particles 205 to the sum of the volume of the negative electrode active material particles 205 and the volume of the solid electrolyte particles 100 in the negative electrode 203 may be 0.30 or more and 0.95 or less.

The electrode material 1100 shown in FIG. 2 may be included in the negative electrode 203. To prevent the solid electrolyte particles 100 from reacting with the negative electrode active material (i.e., the electrode active material particles 206), the coating layer 216 may be formed on the surface of each of the electrode active material particles 206. In this case, the battery has a high charge and discharge efficiency. Examples of the coating material included in the coating layer 216 include a sulfide solid electrolyte, an oxide solid electrolyte, a solid polymer electrolyte, and a halide solid electrolyte.

In the case where the solid electrolyte particles 100 are those of the first solid electrolyte material, the coating material may be a sulfide solid electrolyte, an oxide solid electrolyte, or a solid polymer electrolyte. An example of the sulfide solid electrolyte is $Li_2S—P_2S_5$. An example of the oxide solid electrolyte is trilithium phosphate. An example of the solid polymer electrolyte is a composite compound of polyethylene oxide and a lithium salt. Such a solid polymer electrolyte is, for example, lithium bis(trifluoromethanesulfonyl)imide.

From the viewpoint of energy density and power output of the battery, the negative electrode 203 may have a thickness of 10 μm or more and 500 μm or less.

To increase the ionic conductivity, at least one selected from the group consisting of the positive electrode 201, the electrolyte layer 202, and the negative electrode 203 may include the second solid electrolyte material. Examples of the second solid electrolyte material include a sulfide solid electrolyte, an oxide solid electrolyte, a halide solid electrolyte, and a solid organic polymer electrolyte.

In the present disclosure, the term "sulfide solid electrolyte" refers to a solid electrolyte containing sulfur. The term "oxide solid electrolyte" refers to a solid electrolyte containing oxygen. The oxide solid electrolyte may contain anions in addition to oxygen (excluding sulfur anions and halogen anions). The term "halide solid electrolyte" refers to a solid electrolyte containing a halogen element and being free of sulfur. The halide solid electrolyte may contain oxygen in addition to a halogen element.

Examples of the sulfide solid electrolyte include $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$.

Examples of the oxide solid electrolyte include:

(i) a NASICON solid electrolyte such as $LiTi_2(PO_4)_3$ and element-substituted substances thereof;

(ii) a perovskite solid electrolyte such as $(LaLi)TiO_3$;

(iii) a LISICON solid electrolyte such as $Li_{14}ZnGe_4O_{16}$, $Li_4SiO_4$, and $LiGeO_4$ and element-substituted substances thereof;

(iv) a garnet solid electrolyte such as $Li_7La_3Zr_2O_{12}$ and element-substituted substances thereof; and (v) $Li_3PO_4$ and N-substituted substances thereof.

An example of the halide solid electrolyte is a compound represented by $Li_aMe'_bY_cZ_6$. Here, mathematical relations $a+mb+3c=6$ and $c>0$ are satisfied. Me' is at least one selected from the group consisting of metalloid elements and metal elements excluding Li and Y. Z is at least one selected from the group consisting of F, Cl, Br, and I. The value m represents the valence of Me'.

The "metalloid elements" are B, Si, Ge, As, Sb, and Te. The "metal elements" are: all the elements included in Groups 1 to 12 of the periodic table (excluding hydrogen); and all the elements included in Groups 13 to 16 of the periodic table (excluding B, Si, Ge, As, Sb, Te, C, N, P, O, S, and Se).

To increase the ionic conductivity of the halide solid electrolyte, Me' may be at least one selected from the group consisting of Mg, Ca, Sr, Ba, Zn, Sc, Al, Ga, Bi, Zr, Hf, Ti, Sn, Ta, and Nb.

Examples of the halide solid electrolyte include $Li_3YCl_6$ and $Li_3YBr_6$.

In the case where the electrolyte layer 202 includes the first solid electrolyte material, the negative electrode 203 may include a sulfide solid electrolyte. In this case, the sulfide solid electrolyte that is electrochemically stable with respect to the negative electrode active material suppresses contact between the first solid electrolyte material and the negative electrode active material. As a result, the battery has a low internal resistance.

An example of the solid organic polymer electrolyte is a compound of a polymer compound and a lithium salt. The polymer compound may have an ethylene oxide structure. A polymer compound having an ethylene oxide structure can contain a large amount of a lithium salt, and accordingly has a higher ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate transfer of lithium ions and thereby improve the output characteristics of the battery, at least one selected from the group consisting of the positive electrode 201, the electrolyte layer 202, and the negative electrode 203 may include a nonaqueous electrolyte solution, a gel electrolyte, or an ionic liquid.

The nonaqueous electrolyte solution contains a nonaqueous solvent and a lithium salt dissolved in the nonaqueous solvent. Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The concentration of the lithium salt falls within a range, for example, from 0.5 mol/L to 2 mol/L.

As the gel electrolyte, a polymer material impregnated with a nonaqueous electrolyte solution can be used. Examples of the polymer material include polyethylene oxide, polyacrylonitrile, polyvinylidene fluoride, polymethyl methacrylate, and a polymer having an ethylene oxide bond.

Examples of cations contained in the ionic liquid include:

(i) aliphatic linear quaternary salts such as tetraalkylammoniums and tetraalkylphosphoniums;

(ii) aliphatic cyclic ammoniums such as pyrrolidiniums, morpholiniums, imidazoliniums, tetrahydropyrimidiniums, piperaziniums, and piperidiniums; and (iii) nitrogen-containing heterocyclic aromatic cations such as pyridiniums and imidazoliums.

Examples of anions contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

To improve the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. As the binder, a copolymer may be used. Examples of the binder include a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more selected from the above materials may be used.

To increase the electronic conductivity, at least one selected from the group consisting of the positive electrode 201 and the negative electrode 203 may contain a conductive additive.

Examples of the conductive additive include:

(i) graphites such as natural graphite and artificial graphite;

(ii) carbon blacks such as acetylene black and ketjen black;

(iii) conductive fibers such as a carbon fiber and a metal fiber;

(iv) fluorinated carbon;

(v) metal powders such as an aluminum powder;

(vi) conductive whiskers such as a zinc oxide whisker and a potassium titanate whisker;

(vii) a conductive metal oxide such as titanium oxide; and (viii) a conductive polymer compound such as polyaniline compound, polypyrrole compound, and polythiophene compound. To reduce the cost, the conductive additive in (i) or (ii) above may be used.

Examples of the shape of the battery according to the second embodiment include a coin type, a cylindrical type, a prismatic type, a sheet type, a button type, a flat type, and a stack type.

The battery according to the second embodiment may be manufactured, for example, by preparing a material for forming a positive electrode, a material for forming an electrolyte layer, and a material for forming a negative electrode, and producing by a known method a stack in which the positive electrode, the electrolyte layer, and the negative electrode are disposed in this order.

EXAMPLES

The present disclosure will be described below in more detail with reference to examples and a comparative example.

Example 1

[Production of Solid Electrolyte Material]

In a dry atmosphere with a dew point of −30° C. or less (hereinafter referred to as "dry atmosphere"), $Li_2O_2$, $ZrCl_4$, and $P_2O_5$ were prepared as raw material powders at a molar ratio of $Li_2O_2:ZrCl_4:P_2O_5=0.7:1:0.02$. These raw material powders were mixed together in a mortar to obtain a mixed powder. The obtained mixed powder was milled with a planetary ball mill at 600 rpm for 24 hours. Thus, a solid electrolyte material consisting of Li, Zr, O, Cl, and P according to Example 1 was obtained.

[Composition Analysis of Solid Electrolyte Material]

As for the obtained solid electrolyte material according to Example 1, the content of Li and the content of Zr were measured by a high-frequency inductively coupled plasma emission spectrometry with a high-frequency inductively coupled plasma emission spectrometer (iCAP7400 manufactured by Thermo Fisher Scientific K.K.). The content of Cl was measured by an ion chromatography with an ion chromatography device (ICS-2000 manufactured by Dionex Corporation). The content of O was measured by an inert gas fusion-infrared absorption method with an oxygen analyzer (EMGA-930 manufactured by HORIBA, Ltd.). The molar ratio Li/M, the molar ratio O/X, and the molar ratio A/M were calculated from the measurement results. The content of A adopted here was the charge amount.

The solid electrolyte material according to Example 1 had a molar ratio Li/M of 1.4, a molar ratio O/X of 0.31, and a molar ratio A/M of 0.04.

[Ionic Conductivity Evaluation]

Figure 3:
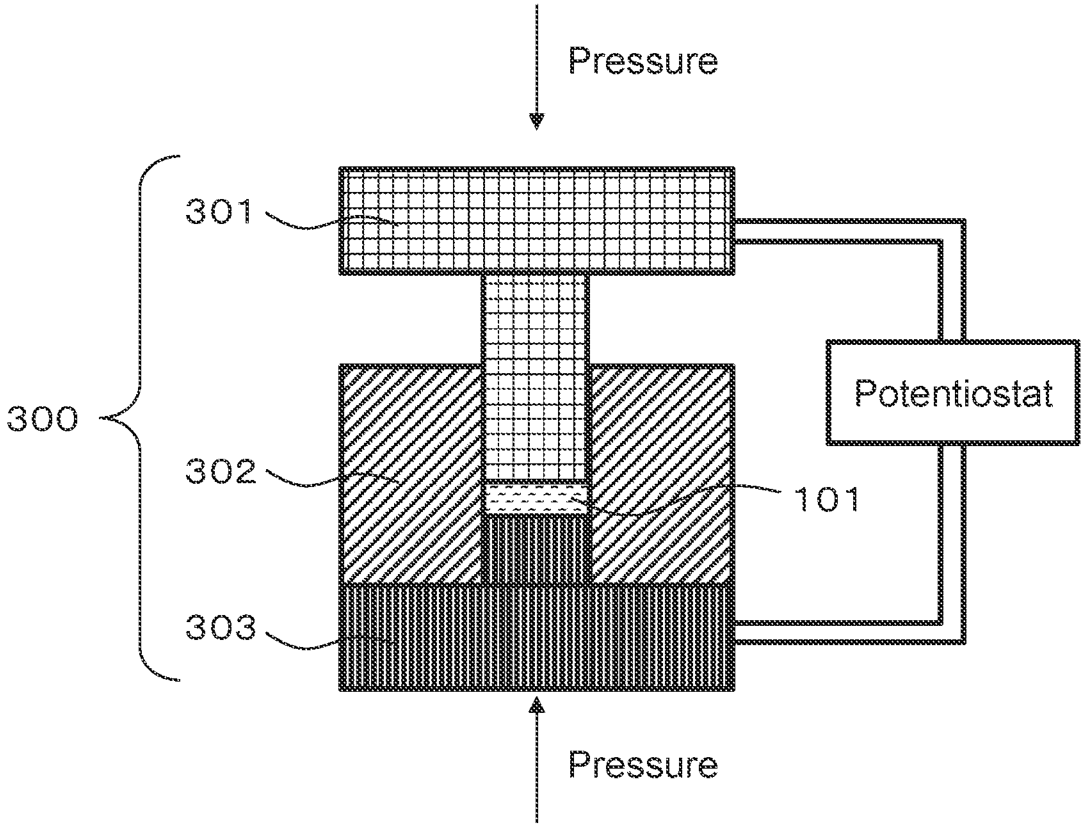
FIG. 3 shows a schematic view of a pressure-molding die 300 used to evaluate the ionic conductivity of solid electrolyte materials.

FIG. 3 shows a schematic view of a pressure-molding die 300 used to evaluate the ionic conductivity of solid electrolyte materials.

The pressure-molding die 300 included an upper punch 301, a die 302, and a lower punch 303. The die 302 was formed of polycarbonate, which is insulating. The upper punch 301 and the lower punch 303 were each formed of stainless steel, which is electronically conductive.

The pressure-molding die 300 shown in FIG. 3 was used to measure the ionic conductivity of the solid electrolyte material according to Example 1 by the following method.

In a dry atmosphere, the powder of the solid electrolyte material according to Example 1 (i.e., a solid electrolyte material powder 101 in FIG. 3) was charged into the pressure-molding die 300. Inside the pressure-molding die 300, a pressure of 300 MPa was applied to the solid electrolyte material according to Example 1 with the upper punch 301. Thus, an evaluation cell according to Example 1 was obtained.

While the pressure was applied to the evaluation cell, the upper punch 301 and the lower punch 303 were connected to a potentiostat (VersaSTAT4 manufactured by Princeton Applied Research) equipped with a frequency response analyzer. The upper punch 301 was connected to the working electrode and the potential measurement terminal. The lower punch 303 was connected to the counter electrode and the reference electrode. The ionic conductivity of the solid electrolyte material according to Example 1 was measured at room temperature by an electrochemical impedance measurement method. The results indicate that the ionic conductivity measured at 22° C. was 1.82 mS/cm.

[Production of Battery]

In an argon atmosphere with a dew point of −60° C. or less, the solid electrolyte material according to Example 1 and $LiCoO_2$ were prepared at a volume ratio of the solid electrolyte material: $LiCoO_2$=30:70. These materials were mixed together in an agate mortar. Thus, a positive electrode mixture was obtained.

In an insulating tube having an inner diameter of 9.5 mm, the solid electrolyte material according to Example 1 (80 mg) and the positive electrode mixture (8.2 mg) were stacked to obtain a stack. A pressure of 360 MPa was applied to this stack to form a solid electrolyte layer and a positive electrode. The solid electrolyte layer had a thickness of 500 μm.

Next, a Li—In alloy (thickness: 200 μm) was stacked on the solid electrolyte layer. A pressure of 80 MPa was applied to this stack to form a negative electrode.

Next, stainless steel current collectors were attached to the positive electrode and the negative electrode, and current collector leads were attached to the current collectors.

Finally, an insulating ferrule was used to block the inside of the insulating tube from the outside air atmosphere and seal the tube.

Thus, a battery according to Example 1 was obtained.

[Charge and Discharge Test]

Figure 4:
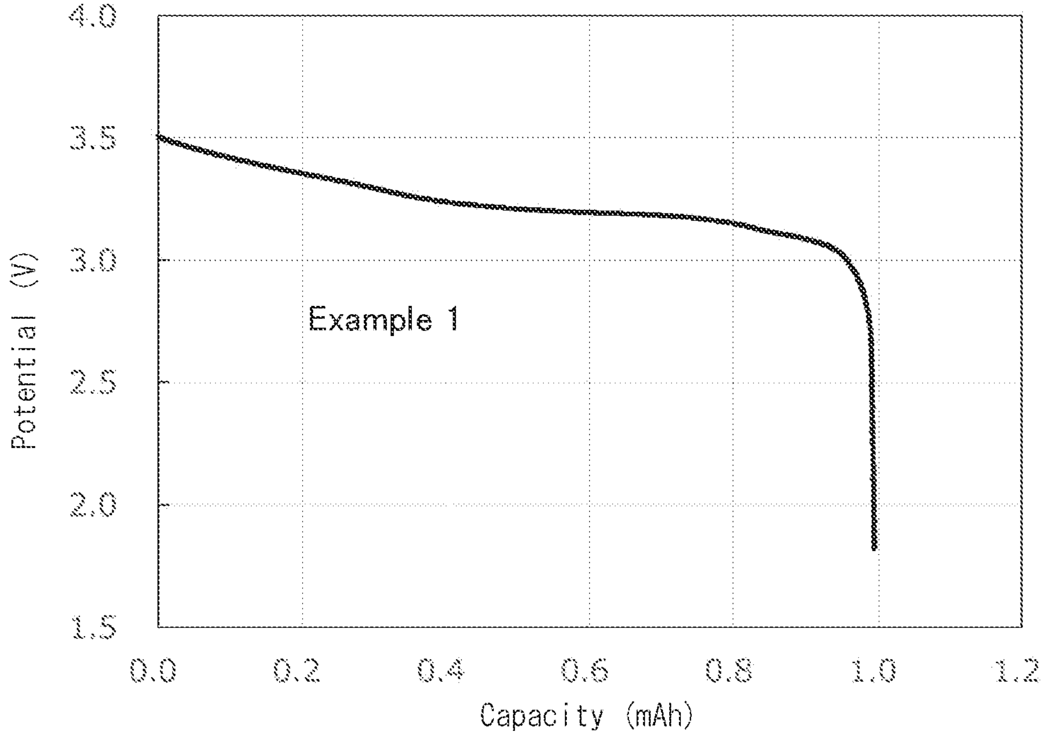
FIG. 4 is a graph showing the initial discharge characteristics of a battery according to Example 1.

FIG. 4 is a graph showing the initial discharge characteristics of the battery according to Example 1. The horizontal axis represents the discharge capacity. The vertical axis represents the voltage. The results shown in FIG. 4 were obtained from measurement performed by the following method.

The battery according to Example 1 was placed in a thermostatic chamber kept at 25° C.

The battery according to Example 1 was charged to a voltage of 3.6 V at a current value of 0.05 C rate (20 hour rate) with respect to the theoretical capacity of the battery. Next, the battery according to Example 1 was discharged to a voltage of 1.9 V at a current value of 0.05 C rate.

The results of the charge and discharge test indicate that the battery according to Example 1 had an initial discharge capacity of 0.99 mAh.

Examples 2 to 9 and Comparative Example 1

[Production of Solid Electrolyte Material]

In Example 2, $Li_2O_2$, $ZrCl_4$, and $P_2O_5$ were prepared as raw material powders at a molar ratio of $Li_2O_2$:$ZrCl_4$:$P_2O_5$=0.75:1:0.04.

In Example 3, $Li_2O_2$, $ZrCl_4$, and $P_2O_5$ were prepared as raw material powders at a molar ratio of $Li_2O_2$:$ZrCl_4$:$P_2O_5$=0.75:1:0.06.

In Example 4, $Li_2O_2$, $ZrCl_4$, and $P_2O_5$ were prepared as raw material powders at a molar ratio of $Li_2O_2$:$ZrCl_4$:$P_2O_5$=0.75:1:0.08.

In Example 5, $Li_2O_2$, $ZrCl_4$, and $P_2O_5$ were prepared as raw material powders at a molar ratio of $Li_2O_2$:$ZrCl_4$:$P_2O_5$=0.75:1:0.1.

In Example 6, $Li_2O_2$, $ZrCl_4$, and $P_2O_5$ were prepared as raw material powders at a molar ratio of $Li_2O_2$:$ZrCl_4$:$P_2O_5$=0.75:1:0.2.

In Example 7, $Li_2O_2$, $ZrCl_4$, and $P_2O_5$ were prepared as raw material powders at a molar ratio of $Li_2O_2$:$ZrCl_4$:$P_2O_5$=0.75:1:0.3.

In Example 8, $Li_2O_2$, $ZrCl_4$, and $B_2O_3$ were prepared as raw material powders at a molar ratio of $Li_2O_2$:$ZrCl_4$:$B_2O_3$=0.65:1:0.066.

In Example 9, $Li_2O_2$, $ZrCl_4$, and $B_2O_3$ were prepared as raw material powders at a molar ratio of $Li_2O_2$:$ZrCl_4$:$B_2O_3$=0.65:1:0.10.

In Comparative Example 1, LiCl and $ZrCl_4$ were prepared as raw material powders at a molar ratio of LiCl:$ZrCl_4$=2:1.

Solid electrolyte materials according to Examples 2 to 9 and Comparative Example 1 were obtained as in Example 1 except for the matters described above.

[Composition Analysis of Solid Electrolyte Material]

As in Example 1, the compositions were analyzed with respect to the solid electrolyte materials according to Examples 2 to 9 and Comparative Example 1.

The solid electrolyte material according to Example 2 had a molar ratio Li/M of 1.5, a molar ratio O/X of 0.35, and a molar ratio A/M of 0.08.

The solid electrolyte material according to Example 3 had a molar ratio Li/M of 1.5, a molar ratio O/X of 0.37, and a molar ratio A/M of 0.12.

The solid electrolyte material according to Example 4 had a molar ratio Li/M of 1.5, a molar ratio O/X of 0.39, and a molar ratio A/M of 0.16.

The solid electrolyte material according to Example 5 had a molar ratio Li/M of 1.5, a molar ratio O/X of 0.41, and a molar ratio A/M of 0.20.

The solid electrolyte material according to Example 6 had a molar ratio Li/M of 1.5, a molar ratio O/X of 0.52, and a molar ratio A/M of 0.40.

The solid electrolyte material according to Example 7 had a molar ratio Li/M of 1.5, a molar ratio O/X of 0.63, and a molar ratio A/M of 0.60.

The solid electrolyte material according to Example 8 had a molar ratio Li/M of 1.3, a molar ratio O/X of 0.30, and a molar ratio A/M of 0.13.

The solid electrolyte material according to Example 9 had a molar ratio Li/M of 1.3, a molar ratio O/X of 0.32, and a molar ratio A/M of 0.20.

The solid electrolyte material according to Comparative Example 1 had a molar ratio Li/M of 2.0 and a molar ratio O/X of 0.

[Ionic Conductivity Evaluation]

As in Example 1, the ionic conductivity was measured with respect to the solid electrolyte materials according to Examples 2 to 9 and Comparative Example 1. The measurement results are shown in Table 1.

TABLE 1

| | Constituent element | M | A | X | Molar ratio Li/M | Molar ratio O/X | Molar ratio A/M | Ionic conductivity [mS/cm] |
|---|---|---|---|---|---|---|---|---|
| Example 1 | Li, Zr, O, | Zr | P | Cl | 1.4 | 0.31 | 0.04 | 1.82 |
| Example 2 | Cl, P | Zr | P | Cl | 1.5 | 0.35 | 0.08 | 1.91 |
| Example 3 | | Zr | P | Cl | 1.5 | 0.37 | 0.12 | 1.90 |
| Example 4 | | Zr | P | Cl | 1.5 | 0.39 | 0.16 | 1.53 |
| Example 5 | | Zr | P | Cl | 1.5 | 0.41 | 0.20 | 1.63 |
| Example 6 | | Zr | P | Cl | 1.5 | 0.52 | 0.40 | 1.24 |
| Example 7 | | Zr | P | Cl | 1.5 | 0.63 | 0.60 | 0.42 |
| Example 8 | Li, Zr, O, | Zr | B | Cl | 1.3 | 0.30 | 0.13 | 1.53 |
| Example 9 | Cl, B | Zr | B | Cl | 1.3 | 0.32 | 0.20 | 1.02 |
| Comparative Example 1 | Li, Zr, Cl | Zr | — | Cl | 2.0 | 0 | — | 0.40 |

DISCUSSION

As is clear from Table 1, the solid electrolyte materials according to Examples 1 to 9 each have a high ionic conductivity of 0.42 mS/cm or more near room temperature.

As is clear from comparing Examples 1 to 5 with Examples 6 and 7, a solid electrolyte material having a molar ratio A/M of 0.04 or more and 0.20 or less has a higher ionic conductivity.

The comparison between Example 5 and Example 9, which have a molar ratio A/M of the same value, demonstrates that a solid electrolyte material in which A includes P tends to have an improved ionic conductivity.

In the case where F, Br, or I is used as X, an ionic conductivity comparable to those of the solid electrolyte materials according to Examples 1 to 9 can be achieved as well. Further, the above tendency holds true for this case as well. These elements have chemical and electronic properties that are quite similar to those of Cl, and these elements can be substituted for part or the whole of Cl.

In the case where Ti or Hf is used as M, an ionic conductivity comparable to those of the solid electrolyte materials according to Examples 1 to 9 can be achieved as well. Further, the above tendency holds true for this case as well. These elements have chemical and electronic properties that are quite similar to those of Zr, and these elements can be substituted for part or the whole of Zr.

The batteries according to all the examples were charged and discharged at room temperature.

The solid electrolyte materials according to Examples 1 to 9 are free of sulfur, and accordingly generate no hydrogen sulfide.

As described above, the solid electrolyte material according to the present disclosure is a highly useful material that can, for example, improve the lithium-ion conductivity while suppressing generation of hydrogen sulfide, and is suitable for providing batteries that can be favorably charged and discharged.

INDUSTRIAL APPLICABILITY

The solid electrolyte material of the present disclosure is utilized, for example, in all-solid-state lithium-ion secondary batteries.

What is claimed is:

1. A solid electrolyte material comprising:

Li;

M;

O;

X; and

A, wherein the M is at least one selected from the group consisting of Ti, Zr, and Hf, the X is at least one selected from the group consisting of F, Cl, Br, and I, the A is at least one selected from the group consisting of P and B, a molar ratio of the Li to the M is 1.0 or more and 3.0 or less, a molar ratio of the O to the X is 0.2 or more and 0.7 or less, and a molar ratio of the A to the M is 0.02 or more and 0.60 or less.

2. The solid electrolyte material according to claim 1, wherein the M includes Zr.

3. The solid electrolyte material according to claim 1, wherein the X includes Cl.

4. The solid electrolyte material according to claim 1, wherein the A includes P.

5. The solid electrolyte material according to claim 1, wherein the molar ratio of the A to the M is 0.04 or more and 0.20 or less.

6. A battery comprising:

a positive electrode;

a negative electrode; and an electrolyte layer disposed between the positive electrode and the negative electrode, wherein at least one selected from the group consisting of the positive electrode, the negative electrode, and the electrolyte layer includes the solid electrolyte material according to claim 1.

7. The solid electrolyte material according to claim 1, wherein the molar ratio of the A to the M is 0.02 or more and 0.40 or less.

8. The solid electrolyte material according to claim 1, wherein the M includes Zr, and the molar ratio of the A to the M is 0.02 or more and 0.40 or less.

* * * * *